(12) United States Patent
Atkins et al.

(10) Patent No.: US 9,501,817 B2
(45) Date of Patent: Nov. 22, 2016

(54) IMAGE RANGE EXPANSION CONTROL METHODS AND APPARATUS

(71) Applicant: Dolby Laboratories Licensing Corporation, San Francisco, CA (US)

(72) Inventors: Robin Atkins, Campbell, CA (US); Steve Margerm, New Westminster (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/721,345

(22) Filed: May 26, 2015

(65) Prior Publication Data

US 2015/0254823 A1 Sep. 10, 2015

Related U.S. Application Data

(63) Continuation of application No. 13/442,708, filed on Apr. 9, 2012, now abandoned.

(60) Provisional application No. 61/473,691, filed on Apr. 8, 2011.

(51) Int. Cl.
*H04N 1/60* (2006.01)
*G09G 5/02* (2006.01)
*G06T 5/00* (2006.01)
(Continued)

(52) U.S. Cl.
CPC ........... *G06T 5/009* (2013.01); *G06K 9/00234* (2013.01); *G09G 5/04* (2013.01); *G09G 5/10* (2013.01); *H04N 21/4854* (2013.01); *H04N 21/84* (2013.01); *G06T 2207/10024* (2013.01); *G06T 2207/20008* (2013.01); *G06T 2207/20208* (2013.01); *G09G 2320/0271* (2013.01); *G09G 2320/066* (2013.01); *G09G 2320/0673* (2013.01); *G09G 2320/08* (2013.01); *G09G 2340/04* (2013.01); *G09G 2340/0428* (2013.01);
(Continued)

(58) Field of Classification Search
CPC .............. G06K 9/00234; G06T 5/009; H04N 1/6058; G09G 5/02
USPC ........................................................ 345/581
See application file for complete search history.

(56) References Cited

U.S. PATENT DOCUMENTS 6,212,329 B1 4/2001 Sugahara
6,335,983 B1 * 1/2002 McCarthy ............ H04N 1/6058
358/523

(Continued)

FOREIGN PATENT DOCUMENTS

EP 2043086 4/2009
FR 2933837 1/2010
(Continued)

OTHER PUBLICATIONS

Rempel, A.G. et al., "Ldr2Hdr: On-the fly Reverse Tone Mapping of Legacy Video and Photographs", ACM Transactions on Graphics, vol. 26, No. 3, Jul. 29, 2007, p. 39.

*Primary Examiner* — Jacinta M Crawford
*Assistant Examiner* — Shivang Patel

(57) ABSTRACT

Image data is adjusted for display on a target display. Maximum safe expansions for one or more attributes of the image data are compared to maximum available expansions for the attributes. An amount of expansion is selected that does not exceed either of the maximum safe expansion and the maximum available expansion. Artifacts caused by over expansion may be reduced or avoided.

18 Claims, 4 Drawing Sheets

(51) Int. Cl.
  *G09G 5/10* (2006.01)
  *H04N 21/485* (2011.01)
  *H04N 21/84* (2011.01)
  *G06K 9/00* (2006.01)
  *G09G 5/04* (2006.01)

(52) U.S. Cl.
  CPC ...... *G09G 2340/06* (2013.01); *G09G 2370/04* (2013.01)

(56) References Cited

U.S. PATENT DOCUMENTS

| | | | |
|---|---|---|---|
| 6,754,384 B1 | 6/2004 | Spaulding | |
| 6,771,323 B1 | 8/2004 | Dean | |
| 7,011,413 B2 | 3/2006 | Wada | |
| 7,133,156 B2 | 11/2006 | Motomura | |
| 7,656,462 B2 | 2/2010 | Weston | |
| 7,911,479 B2 | 3/2011 | Yao | |
| 8,386,536 B2* | 2/2013 | Gotou | G06F 21/6218 707/754 |
| 8,570,438 B2 | 10/2013 | Bhaskaran | |
| 2005/0083344 A1* | 4/2005 | Higgins | G09G 5/02 345/600 |
| 2007/0022464 A1 | 1/2007 | Dean | |
| 2007/0052986 A1* | 3/2007 | Spaulding | H04N 1/6058 358/1.9 |
| 2007/0098083 A1 | 5/2007 | Visharam | |
| 2007/0291179 A1* | 12/2007 | Sterling | H04N 1/6058 348/642 |
| 2008/0084502 A1 | 4/2008 | Lee | |
| 2008/0095228 A1 | 4/2008 | Hannuksela | |
| 2008/0129861 A1 | 6/2008 | Choi | |
| 2008/0195977 A1 | 8/2008 | Carroll | |
| 2009/0154798 A1 | 6/2009 | Mizukura | |
| 2010/0020242 A1* | 1/2010 | Lammers | G09G 5/02 348/642 |
| 2010/0046834 A1 | 2/2010 | Ohga | |
| 2010/0134496 A1 | 6/2010 | Bhaskaran | |
| 2010/0220237 A1 | 9/2010 | Doser | |
| 2010/0253846 A1 | 10/2010 | Fergason | |
| 2011/0305391 A1* | 12/2011 | Kunkel | H04N 1/6088 382/167 |
| 2012/0321273 A1* | 12/2012 | Messmer | G11B 27/031 386/224 |

FOREIGN PATENT DOCUMENTS

| | | |
|---|---|---|
| GB | 2463375 | 3/2010 |
| KR | 2010-0092693 | 8/2010 |
| WO | 01/69936 | 9/2001 |
| WO | 02/32147 | 4/2002 |
| WO | 2005/125178 | 12/2005 |
| WO | 2010/134459 | 11/2010 |

* cited by examiner

IMAGE RANGE EXPANSION CONTROL METHODS AND APPARATUS

CROSS-REFERENCE TO RELATED APPLICATIONS

This application is a continuation of U.S. patent application Ser. No. 13/442,708 filed on Apr. 9, 2012, which claims the benefit of filing date of U.S. Provisional Patent Application No. 61/473,691 filed on Apr. 8, 2011, all of which are incorporated herein by reference in its entirely.

TECHNICAL FIELD

The invention relates to displaying images and relates specifically to methods and apparatus involving the adjustment of image data for display on target displays.

BACKGROUND OF THE INVENTION

Display apparatus may employ any of a wide range of technologies. Some non-limiting examples are plasma displays, liquid crystal displays (LCDs), cathode ray tube (CRT) displays, organic light emitting diode (OLED) displays, projection displays that use any of various light sources in combination with various spatial light modulation technologies, and so on. Displays may be of a wide variety of types used in any of a wide variety of applications. For example, the term display encompasses without limitation apparatus such as: televisions, computer displays, media player displays, displays in hand-held devices, displays used on control panels for equipment of different kinds, electronic game displays, digital cinema displays, special purpose displays such as virtual reality displays, advertising displays, stadium displays, medical imaging displays, and so on.

Different displays may have different capabilities in areas such as: black level, maximum brightness (display peak luminance), color gamut, and so on. The appearance of displayed images is also affected by the environment in which a display is being viewed. For example, the luminance of ambient lighting, the color of ambient lighting and screen reflections can all affect the appearance of displayed images.

With the increasing availability of high-performance displays (e.g. displays that have high peak luminance and/or broad color gamuts) comes the problem of how to adjust images for optimum viewing on a particular display or type of displays. Addressing this problem in simplistic ways can result in noticeable artifacts in displayed images. For example, consider the case where an image that appears properly on a display having a moderate peak luminance is displayed on a target display having a very high peak luminance. If one expands the luminance range of the image data to take advantage of the high peak luminance of the target display, the result may be poor due to objectionable artifacts that are rendered apparent by the range expansion. Artifacts may include, for example, one or more of banding, quantization artifacts, visible macroblock edges, objectionable film grain and the like. On the other hand, if the image is displayed on the target display without range expansion, no benefit is gained from the high peak luminance that the target display can achieve.

There is a need for apparatus and methods for processing and/or displaying images that can exploit the capabilities of target displays to provide enhanced viewing while reducing or avoiding undesirable artifacts.

SUMMARY OF THE INVENTION

This invention may be embodied in a wide variety of ways. These include, without limitation, displays (such as television, digital cinema displays, specialty displays such as advertising displays, gaming displays, virtual reality displays, vehicle simulator displays and the like, displays on portable devices), image processing apparatus which may be integrated with a display, stand alone, or integrated with other apparatus such as a media player or the like and media carrying non-transitory instructions which, when executed by a data processor cause the data processor to execute a method according to the invention.

One non-limiting example aspect of the invention provides a method for image processing. The method comprises obtaining image data and metadata associated with the image data. The method processes the metadata with information characterizing a target display to determine a maximum safe expansion for an attribute of the image data and a maximum available expansion for the attribute of the image data. The method processes the image data to expand the attribute of the image data by the lesser of the maximum safe expansion and the maximum available expansion.

In some embodiments the attribute is dynamic range and processing the image data comprises applying a tone mapping curve to the image data. In some embodiments the attribute comprises a color gamut.

Another non-limiting example aspect of the invention provides image processing apparatus. The image processing apparatus comprises a decoder configured to extract image data and metadata associated with the image data from a signal and a controller configured to process the metadata with information characterizing a target display to determine a maximum safe expansion for an attribute of the image data and a maximum available expansion for the attribute of the image data. The controller is further configured to set an expansion amount equal to the smaller of the maximum safe expansion and the maximum available expansion. The apparatus comprises an expander configured to expand the attribute of the image data by the expansion amount to yield modified image data.

Further aspects of the invention and features of specific embodiments of the invention are described below.

BRIEF DESCRIPTION OF THE DRAWINGS

The accompanying drawings illustrate non-limiting embodiments of the invention.

DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
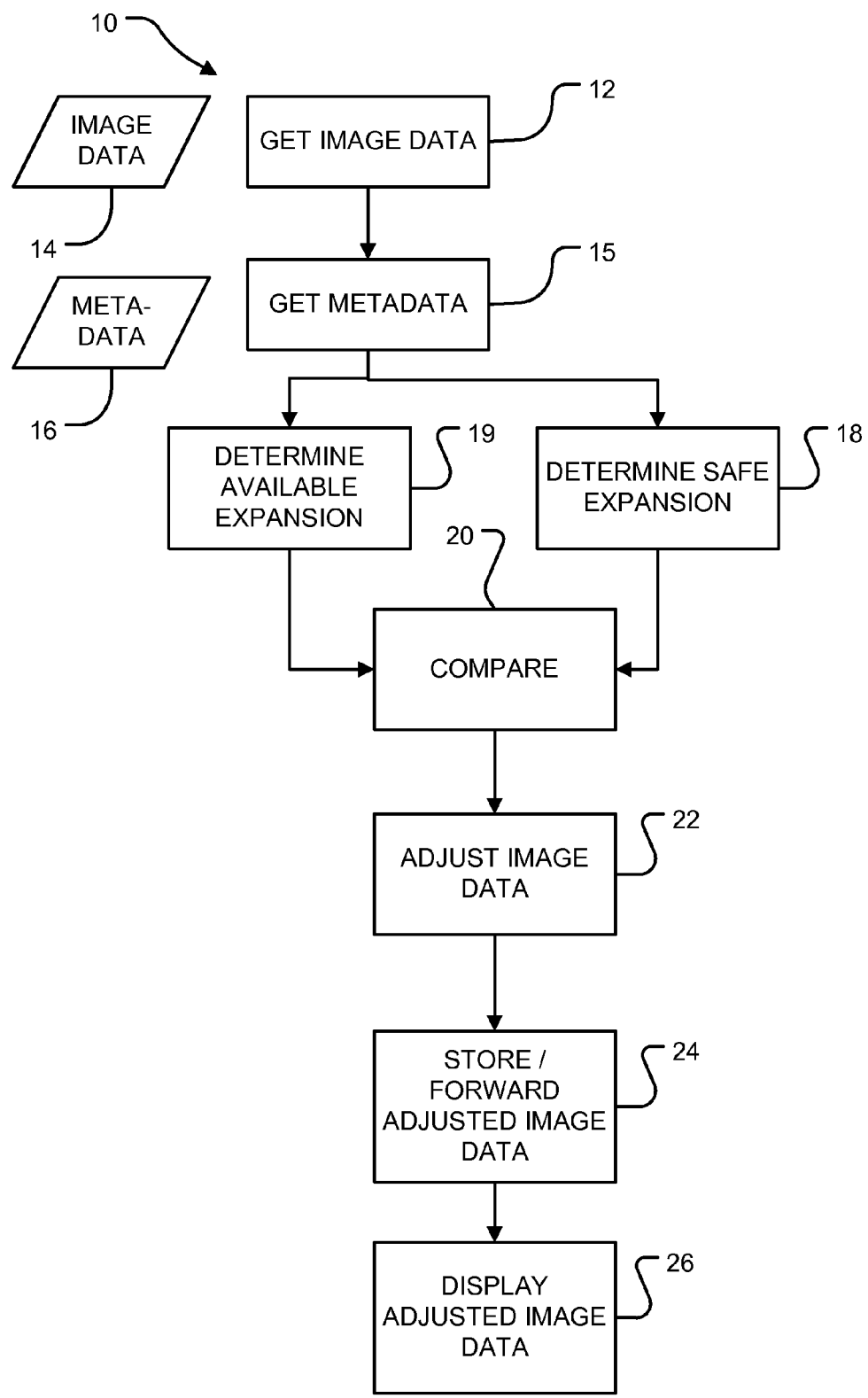
FIG. 1 is a flow chart that illustrates a method according to an example embodiment of the invention.

FIG. 1 is a flow chart that illustrates a method 10 according to an example embodiment of the invention. Method 10 may, for example, be practiced at a target display or in an image processing device upstream from a target display. Method 10 receives image data and adjusts the image data for display on the target display. The adjustment comprises expanding one or more of dynamic range and color gamut.

Block 12 receives image data 14 comprising image content to be displayed on a particular target display. Block 12 may comprise, for example, receiving a data stream comprising the image data 14, accessing a file or other data structure in a data store containing the image data 14, or the like.

Block 15 receives metadata 16 associated with image data 14. Block 15 may comprise, for example, extracting metadata 16 from a side stream, decoding metadata 16 that has been encoded in image data 14, obtaining metadata 16 from a server or other repository by way of a data communication network, accessing a data structure containing metadata 16 or the like. In some embodiments, metadata 16 and image data 14 are both contained in a common data container and blocks 12 and 15 respectively comprise extracting the image data 14 and associated metadata 16 from the data container.

Metadata 16 contains information that is indicative of a degree to which image data 14 can be expanded 'safely' in one or more respects. Here 'safely' means without introducing visible artifacts that unacceptably degrade image quality. One example of information that may be present as metadata 16 is a direct indication of an acceptable degree of expansion (e.g. a number that directly indicates the degree to which the dynamic range (e.g. luminance range) may be safely expanded). Another example is information specifying characteristics of a gamut of a source display on which the content of image data 14 was approved. The gamut characteristics may include one or more of: the colors of primaries of the source display, luminance range of the source display, black and white levels of the source display, points on a three-dimensional gamut boundary of the source display, or the like. Another example is information specifying encoding parameters for image data 14 such as bit depth, encoding quality, color sub-sampling, and the like. Another example of the makeup of metadata 16 is a combination of various ones of the information described above.

Block 18 determines from metadata 16 (or metadata 16 and image data 14 in some embodiments) one or more maximum safe expansions that may be applied to image data 14. For example, block 18 may determine a safe dynamic range expansion and/or a safe chromaticity expansion.

Block 19 determines a maximum available expansion that may be applied to image data 14 to fully exploit the capabilities of target display 30. In cases where method 10 is defined with knowledge of the capabilities of target display 30 (e.g. where method 10 is performed by a system integrated with target display 30) block 19 may determine the maximum available expansion based on metadata 16 (where the metadata 16 specifies capabilities of the source display). For example, if the source display has a peak luminance of 600 nits and target display 30 has a peak luminance of 1800 nits then block 19 may determine that the maximum available expansion is expansion by a factor of 3 (by dividing 1800 by 600 for example). In some cases the maximum safe expansion may be less than the maximum available expansion. For example, in a case where the maximum safe expansion is 2 an expansion of 2 or less will be applied. In the example case where an expansion of 2 is applied, the resulting peak luminance would be 1200 nits (2×600 nits), for this example.

As another example, block 19 may obtain information regarding one or more capabilities of target display 30 by, for example, interrogating target display 30 to determine its capabilities by way of an EDID, E-EDID, DisplayID or similar functionality, retrieving stored information regarding the characteristics of target display 30 from a local data store or an accessible server or the like.

Block 20 compares the maximum safe expansion(s) from block 18 to the maximum available expansion(s) from block 19. If the maximum safe expansion equals or exceeds the maximum available expansion then image data 14 may be expanded by the maximum available expansion for display on the target display. If the maximum safe expansion is less than the maximum available expansion then the expansion of image data 14 should be limited to the maximum safe expansion for display on the target display. Block 20 provides an expansion value equal to the lesser of the maximum safe expansion and the maximum available expansion for one or more image characteristics that may be subjected to expansion.

Block 22 adjusts image data 14 for display on target display 30 by expanding image data 14 according to the expansion value from block 20. In cases where the maximum safe expansion is less than the maximum available expansion, block 22 expands to an intermediate range that is below the maximum capabilities of target display 30. This avoids or keeps to an acceptable level distortions and other artifacts particular to image data 14 that would have been introduced and/or raised to unacceptable levels by expansion exceeding the maximum safe expansion but still within the capabilities of target display 30.

Some embodiments may provide an optional override control that a user may operate to select an expansion exceeding a maximum safe expansion. For example, the override control may have the effect of causing a maximum safe expansion to be set to a very high value or the effect of causing the apparatus to ignore safe expansion limits. Operating the control may have the effect of causing the maximum available expansion to be used. In another example, a user control may permit a user to manually select an expansion. The selection may allow the user to cause the expansion to vary essentially continuously or may allow selection from a set of discrete expansions. An indicator, display or other feedback device may warn the user when the selected expansion exceeds the maximum safe expansion.

Advantageously, block 22 may expand some aspects of image data 14 by the maximum available expansion and other aspects by less than the maximum available expansion. For example, for a particular choice of image data 14 and target display 30, chromaticity may be expanded by a maximum available expansion to take full advantage of an expanded color gamut of target display 30 while luminance is expanded by a maximum safe luminance expansion which is less than a maximum available luminance expansion.

In some example embodiments, block 22 performs expansion(s) according to sigmoidal expansion functions as described, for example, in U.S. application No. 61/453,107 filed on 15 Mar. 2011 and entitled METHODS AND APPARATUS FOR IMAGE DATA TRANSFORMATION which is hereby incorporated herein by reference. That application describes image data expansion based on parameterized sigmoidal tone curve functions. Block 22 may perform expansion of image data 14 according to other suitable mappings that are constrained to limit the amount of expansion to not exceed the maximum safe expansion. For example, the target peak luminance used to calculate the tone curve may be altered from a default value of the maximum capability of the target display, to a peak luminance corresponding to the maximum safe range of expansion indicated by metadata.

Block 24 stores and/or forwards the adjusted image data for display on the target display. Block 26 displays the adjusted image data on the target display.

In some embodiments, image data 14 comprises video data. In such embodiments, the maximum safe expansion may be different for different portions of the video (e.g. for different scenes). Method 10 may be applied separately for such different portions of the video.

Steps in the method of FIG. 1 may be executed by one or more programmed data processors, by hardwired logic circuits, by configurable logic circuits such as field programmable gate arrays (FPGAs) combinations thereof and the like.

APPLICATION EXAMPLE

Figure 2:
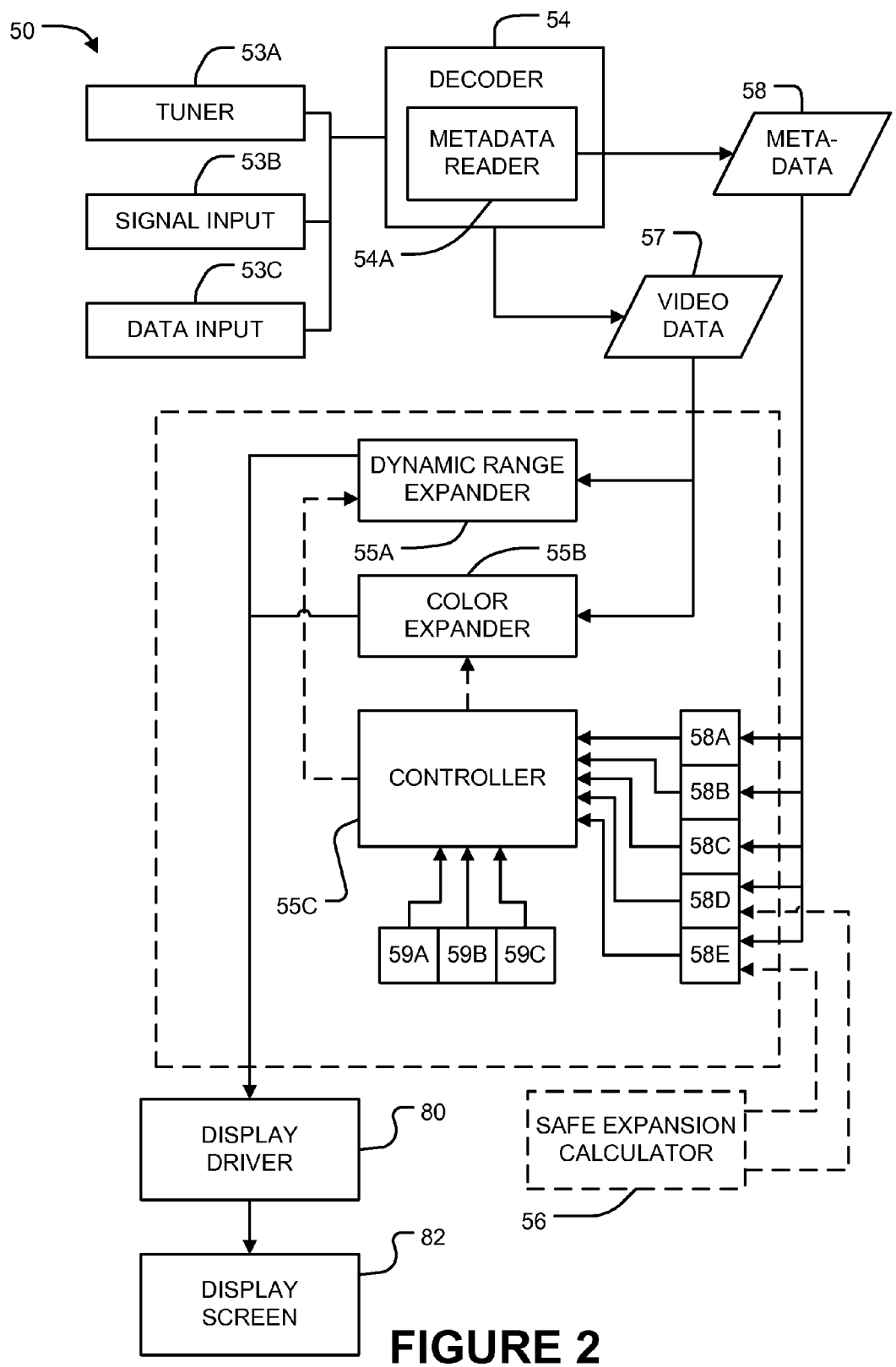
FIG. 2 is a block diagram illustrating apparatus according to an example embodiment.

One application example is illustrated in FIG. 2. A television 50 has a signal input 52 connected to receive a signal containing video content for display from any of a tuner 53A, an external video signal input 53B and a data input 53C. Data input 53C may, for example, be connected to the internet. The signal is delivered to a decoder 54 which includes a metadata reader 54A. Decoder 54 is connected to supply decoded video data to an image processing system 55 comprising a dynamic range (luminance) expander 55A, a color gamut expander 55B and a controller 55C configured to control dynamic range expander 55A and color gamut expander 55B as described below. Image processing system may optionally perform any of a wide variety of additional image processing functions as are known in the art.

In operation, a signal is received at input 52. The signal is decoded to extract video data 57 and metadata 58. In one example, the metadata includes the black point 58A, white point 58B and color gamut 58C of a source display (not shown) on which the video data was viewed for approval and also a maximum dynamic range expansion 58D and a maximum color gamut expansion 58E.

Figure 2A:
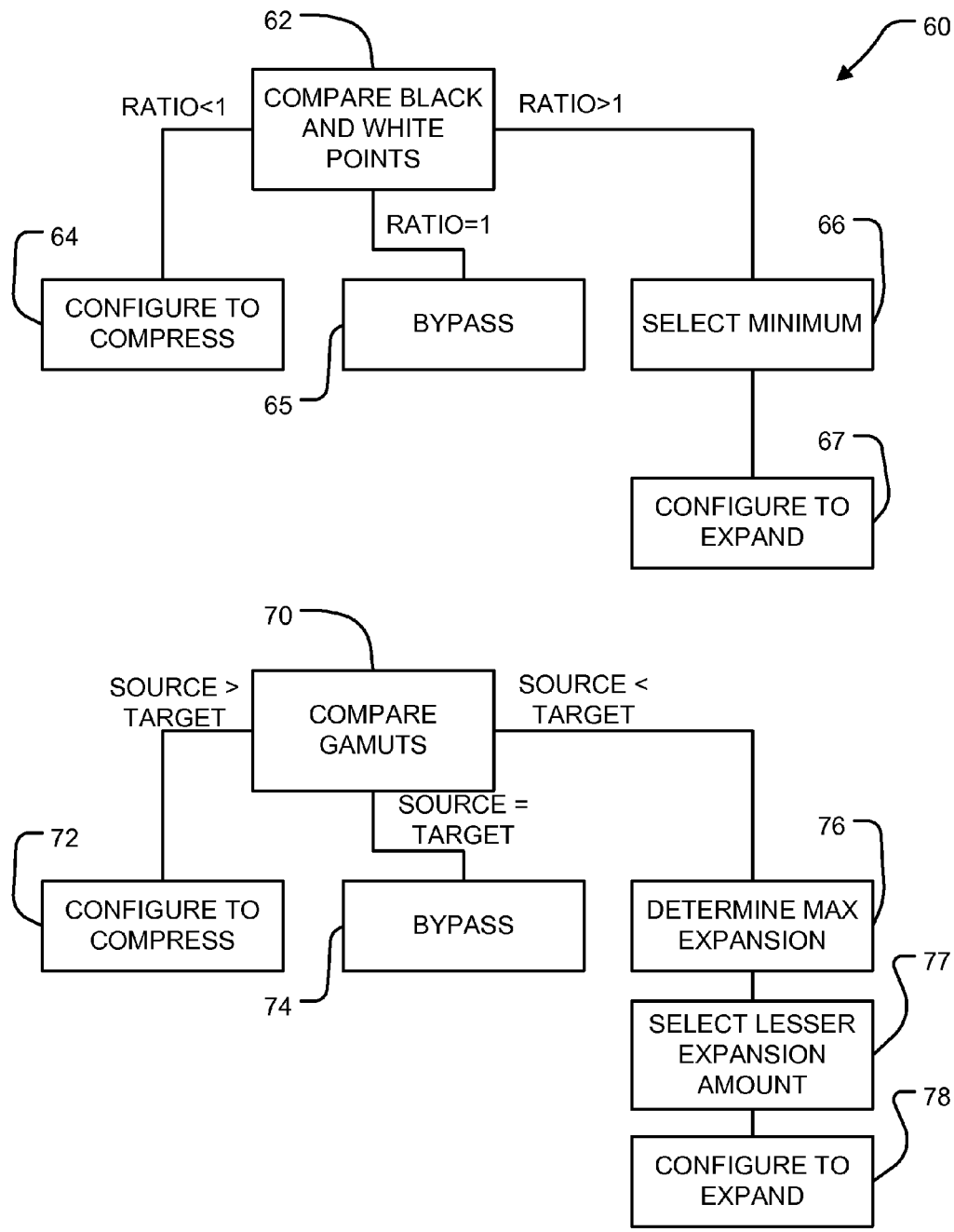
FIG. 2A is a flow chart illustrating a method that may be performed in a controller in the apparatus of FIG. 2 or similar apparatus.

Image processing controller 55C has access to or built into itself information specifying the black point 59A, white point 59B and color gamut 59C of display 50. Controller 55C may perform a method 60 as shown in FIG. 2A. Block 62 compares black point 59A and white point 59B of target display 50 to the black point 58A and white point 58B of the source display. From this comparison, controller 55C determines whether it should cause dynamic range expander 55A to: compress the dynamic range of the video data (e.g. by applying a tone mapping curve to produce altered video data having a lower dynamic range than video data 57) or expand the dynamic range, or leave the dynamic range unaltered. Dynamic range expansion may be beneficial in cases where black point 59A and white point 59B of target display 50 are more widely separated than black point 58A and white point 58B of the source display. Block 62 may comprise taking a ratio ($R_{TRG}/R_{SRC}$) of the dynamic range of the target display $R_{TRG}$ to the dynamic range of the source display $R_{SRC}$ and branching depending upon whether that ratio is greater than, equal to or less than one.

In the case that compression is called for ($R_{TRG}/R_{SRC}<1$) block 64 configures dynamic range expander 55A to compress the video data for display on television 50.

In the case that no compression or expansion is called for ($R_{TRG}/R_{SRC}=1$) block 65 configures dynamic range expander 55A to do nothing or causes the video data to bypass dynamic range expander 55A.

In the case that expansion is called for ($R_{TRG}/R_{SRC}>1$) block 66 picks the smaller of the ratio $R_{TRG}/R_{SRC}$ and the maximum dynamic range expansion 58D. Block 67 then configures dynamic range expander 55A to expand the video data for display on television 50 by the amount determined by block 66 (or a smaller amount).

Consider the specific example where the comparison of the black and white points of the source and target displays indicates that the target display is capable of a dynamic range 1.5 times that of the source display (e.g. $R_{TRG}/R_{SRC}=1.5$ thus a dynamic range expansion up to a maximum of 1.5 is possible). Suppose that metadata 58D indicates a maximum safe dynamic range expansion of 1.2. Then block 66 outputs 1.2 because 1.2<1.5 and block 67 configures dynamic range expander 55A to expand the dynamic range of the video data by a factor of 1.2.

In the illustrated embodiment, television 50 may perform either, both or neither of dynamic range expansion/compression and color gamut expansion/compression. This is not mandatory. Television 50 could be made to address dynamic range expansion/compression and not color gamut expansion/compression or vice versa. Color gamut expansion or compression may be handled in a similar manner to dynamic range expansion or compression.

In the illustrated method 60, block 70 compares the color gamut 59C of television 50 to the color gamut 58C of the source display. If the color gamut 58C of the source display is larger than color gamut 59C of television 50 then block 70 branches to block 72 which configures color gamut expander 55B to compress (compression may include clipping, remapping etc.) the gamut of video data 57 to fit within color gamut 59C.

If the color gamut 58C of the source display and the color gamut 59C of television 50 are equal (to within a desired precision) then block 70 branches to block 74 which leaves the color gamut of video data 72 unaltered or causes color gamut expander 55B to be bypassed.

If the color gamut 58C of the source display lies within the color gamut 59C of television 50 such that color gamut expansion is possible then block 70 branches to block 76 which determines a maximum amount of color gamut expansion such that after color-gamut expansion the video data will still be within the color gamut of television 50. Block 77 outputs the smaller of the output of block 76 and the maximum safe color gamut expansion 58E. Block 78 configures color gamut expander 55B to expand the color gamut of video data 57 by the amount determined by block 77 or a smaller amount.

The image data is applied to display driver 80 which drives display 82 to display images based on the adjusted image data.

FIG. 2 shows an optional safe expansion calculator stage 56. Safe expansion calculator 56 is configured to calculate maximum safe dynamic range expansion and/or maximum safe color gamut expansion based on information other than metadata 58D and 58E. For example, safe expansion calculator 56 may calculate maximum safe dynamic range expansion 58D and maximum safe color gamut expansion 58E in the case that metadata indicating these values is not present in metadata 58. Safe expansion calculator may determine maximum safe dynamic range expansion from information such as: bit depth of the video signal; and/or encoding quality of the video signal. Metadata indicating values for these parameters may be included in metadata 58. Safe expansion calculator may, for example, comprise a lookup table which receives as inputs bit depth and encoding quality of the video signal and produces a maximum safe dynamic range expansion as an output. In some embodiments, safe expansion calculator 56 is integrated with or associated with decoder 54. In some embodiments, safe expansion calculator 56 is connected to receive from decoder 54 information about a received video signal such as bit depth of the video signal, encoding quality of the video signal, and/or other information useful for estimating a maximum safe expansion of the video signal.

Figure 3:
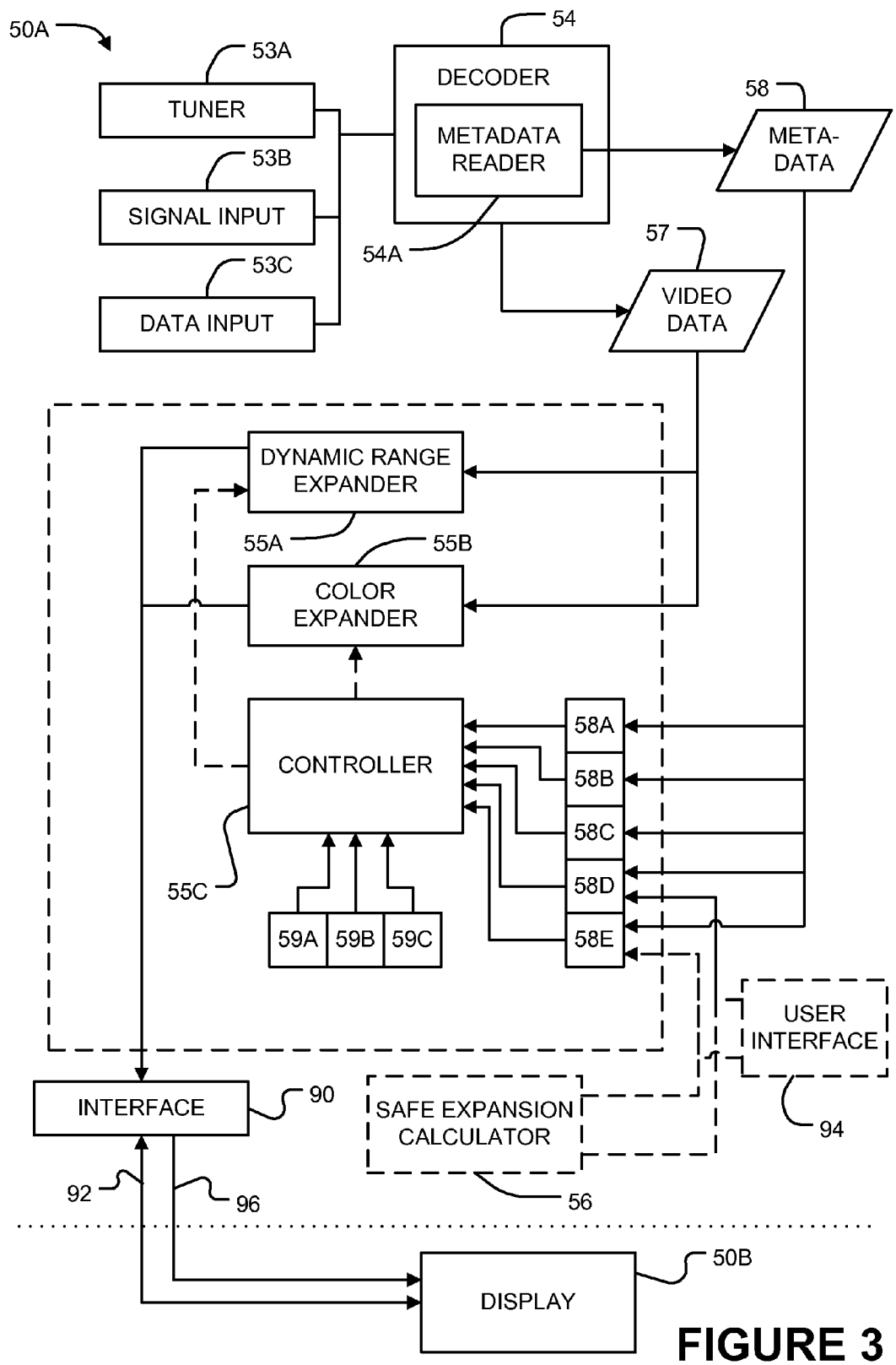
FIG. 3 is a block diagram illustrating apparatus according to an alternative embodiment.

FIG. 3 illustrates apparatus 50A according to an alternative embodiment in which a target display is separate from the apparatus that includes the image processing system 55. FIG. 3 applies the same reference numbers used in FIG. 2 for elements having the same or similar functions.

Apparatus 50A includes an interface 90 for data communication with a separate target display 50B by way of a data communication path 91. Apparatus 50A also includes a user interface 94. Apparatus 50A is configured to obtain characteristics of target display 50B by way of interface 90 (for example by reading information from an EDID, E-EDID or DisplayID data structure hosted in target display 50B). In addition or in the alternative, apparatus 50A may receive information characterizing target display 50B by way of user interface 94. Data processed by image processing system 55 is passed to target display 50B by way of a data communication path 96 that may be wired, wireless, electronic, optical or the like. Data communication path 92 and data communication path 96 may be separate or combined.

Apparatus, systems, modules and components described herein (including without limitation inputs, tuners, decoders, readers, expanders, controllers, calculators, drivers, interfaces, and the like) may comprise software, firmware, hardware, or any combination(s) of software, firmware, or hardware suitable for the purposes described herein. Such software, firmware, hardware and combinations thereof may reside on personal computers, set top boxes, media players, video projectors, servers, displays (such as televisions, computer monitors, and the like) and other devices suitable for the purposes described herein. Furthermore, aspects of the system can be embodied in a special purpose computer or data processor that is specifically programmed, configured, or constructed to perform one or more of the computer-executable instructions explained in detail herein.

Image processing and processing steps as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field-programmable gate array "FPGA"). Image processing and processing steps as described above may operate on and/or produce image data (including without limitation video data, tone mapping curves, metadata, and the like) embodied in computer-readable signals carried on non-transitory media.

Certain implementations of the invention comprise computer processors which execute software instructions which cause the processors to perform a method of the invention. For example, one or more processors in a display, personal computer, set top box, media player, video projector, server, or the like may implement methods as described herein by executing software instructions in a program memory accessible to the processors.

Some aspects of the invention may also be provided in the form of a program product. The program product may comprise any non-transitory medium which carries a set of computer-readable signals comprising instructions which, when executed by a data processor, cause the data processor to execute a method of the invention. For example, such a program product may comprise instructions which cause a data processor in a display to adjust the image data for display on the display. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

Where a component (e.g. a software module, processor, assembly, device, circuit, input, tuner, decoder, reader, expander, controller, calculator, driver, interface, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

These and other changes can be made to the system in light of the above Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications, alterations, additions and permutations may be made without deviating from the spirit and scope of the invention. The embodiments described herein are only examples. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for image processing, the method comprising:
    storing in a non-transitory memory a data stream received over a digital network;
    obtaining, from the stored data stream, image data comprising a digital image to be displayed and metadata, wherein the metadata from the data stream includes both:
        (i) a multiplicative factor value for safe luminance dynamic range expansion for a scene of the image data; and
        (ii) metadata indicative of a luminance dynamic range of a source display, the metadata including parameters for each of color primaries, black level, and white level of the source display;
    obtaining target display information to determine a luminance dynamic range of the target display;
    computing, by one or more processors, a maximum available expansion of a luminance dynamic range for the image data as a ratio of the luminance dynamic range of the target display and the luminance dynamic range of the source display;
    comparing the computed maximum available expansion and the factor value obtained from the data stream; and
    by the one or more processors, expanding the luminance dynamic range of the image data by the lesser of the factor value obtained from the data stream and the computed maximum available expansion.

2. The method of claim 1 wherein obtaining target display information includes interrogating the target display.

3. The method of claim 2 further comprising displaying the image data with expanded luminance dynamic range by the target display.

4. The method of claim 1 further comprising displaying by the target display the image data with expanded luminance dynamic range.

5. A method for image processing, the method comprising:
    storing in a non-transitory memory a data stream received over a digital network;
    obtaining, from the stored data stream, image data comprising a digital image to be displayed and metadata, wherein the metadata from the data stream includes both:
        (i) a multiplicative factor value for safe luminance dynamic range expansion for a scene of the image data and
        (ii) metadata indicative of a luminance dynamic range of a source display, the metadata including parameters for each of color primaries, black level, and white level of the source display;
    obtaining target display information to determine a luminance dynamic range of the target display;
    computing, by one or more processors, a maximum available expansion of a luminance dynamic range for the image data as a ratio of the luminance dynamic range of the target display and the luminance dynamic range of the source display;
    comparing the computed maximum available expansion and the factor value obtained from the data stream; and
    by the one or more processors, expanding without override control the luminance dynamic range of the image data by the lesser of the factor value obtained from the data stream and the computed maximum available expansion using a sigmoidal expansion function, and
    by the one or more processors, expanding with override control the luminance dynamic range of the image data by the computed maximum available expansion.

6. A method for image processing, the method comprising:
    storing in a non-transitory memory a data stream received over a digital network;
    obtaining, from the stored data stream, image data comprising a digital image to be displayed and metadata, wherein the metadata from the data stream includes both:
        (i) a multiplicative factor value for safe luminance dynamic range compression for a scene of the image data and
        (ii) metadata indicative of a luminance dynamic range of a source display, the metadata including parameter for each of color primaries, black level, and white level of the source display;
    obtaining target display information to determine a luminance dynamic range of the target display;
    computing, by one or more processors, a maximum available compression of a luminance dynamic range for the image data as a ratio of the luminance dynamic range of the target display and the luminance dynamic range of the source display;
    comparing the computed maximum available compression and the factor value obtained from the data stream; and
    by the one or more processors, compressing without override control the luminance dynamic range of the image data by the lesser of the factor value obtained from the data stream and the computed maximum available compression using a sigmoidal function, and
    by the one or more processors, compressing with override control the luminance dynamic range of the image data by the computed maximum available compression.

7. A non-transitory computer-readable medium storing a sequence of instructions, which when executed by one or more computing processors, causes the one or more computing processors to perform the method of claim 1.

8. A non-transitory computer-readable medium storing a sequence of instructions, which when executed by one or more computing processors, causes the one or more computing processors to perform the method of claim 2.

9. A non-transitory computer-readable medium storing a sequence of instructions, which when executed by one or more computing processors, causes the one or more computing processors to perform the method of claim 3.

10. A non-transitory computer-readable medium storing a sequence of instructions, which when executed by one or more computing processors, causes the one or more computing processors to perform the method of claim 4.

11. A non-transitory computer-readable medium storing a sequence of instructions, which when executed by one or more computing processors, causes the one or more computing processors to perform the method of claim 5.

12. A non-transitory computer-readable medium storing a sequence of instructions, which when executed by one or more computing processors, causes the one or more computing processors to perform the method of claim 6.

13. An apparatus comprising one or more computing processors configured to perform the method of claim 1.

14. An apparatus comprising one or more computing processors configured to perform the method of claim 2.

15. An apparatus comprising one or more computing processors configured to perform the method of claim 3.

16. An apparatus comprising one or more computing processors configured to perform the method of claim 4.

17. An apparatus comprising one or more computing processors configured to perform the method of claim 5.

18. An apparatus comprising one or more computing processors configured to perform the method of claim 6.

\* \* \* \* \*